United States Patent [19]
Muñoz

[11] Patent Number: 4,475,298
[45] Date of Patent: Oct. 9, 1984

[54] ILLUMINATED DISPLAY ASSEMBLY
[76] Inventor: Roberto Muñoz, 2955 SW. 15 St., Miami, Fla. 33145
[21] Appl. No.: 488,589
[22] Filed: Apr. 25, 1983
[51] Int. Cl.³ .............................................. G09F 13/18
[52] U.S. Cl. ...................................... 40/546; 40/204; 40/442
[58] Field of Search ............... 40/564, 591, 593, 204, 40/205, 442, 546; 362/31

[56] References Cited
U.S. PATENT DOCUMENTS

| | | | |
|---|---|---|---|
| 1,400,296 | 12/1921 | Kusel | 362/31 |
| 2,358,203 | 9/1944 | Best | 362/31 |
| 2,994,148 | 8/1961 | Endelson | 362/31 |
| 4,385,343 | 5/1983 | Plumly | 362/31 |

Primary Examiner—Gene Mancene
Assistant Examiner—Wenceslao J. Contreras
Attorney, Agent, or Firm—John Cyril Malloy

[57] ABSTRACT

An illuminated display assembly comprising a display plate having an illumination source connected thereto wherein a supporting frame and/or shield structure is opaque but includes non-opaque portions defining predetermined words, letters or like indicia. The illumination source may be selectively actuated to illuminate the display plate causing light to be transmitted or directed through the non-opaque portions of the shield structure thereby providing an illuminated display of the non-opaque formed indicia.

9 Claims, 14 Drawing Figures

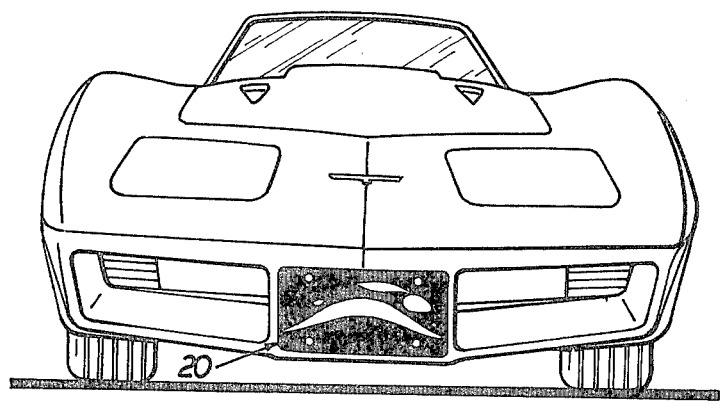
FIG. 1
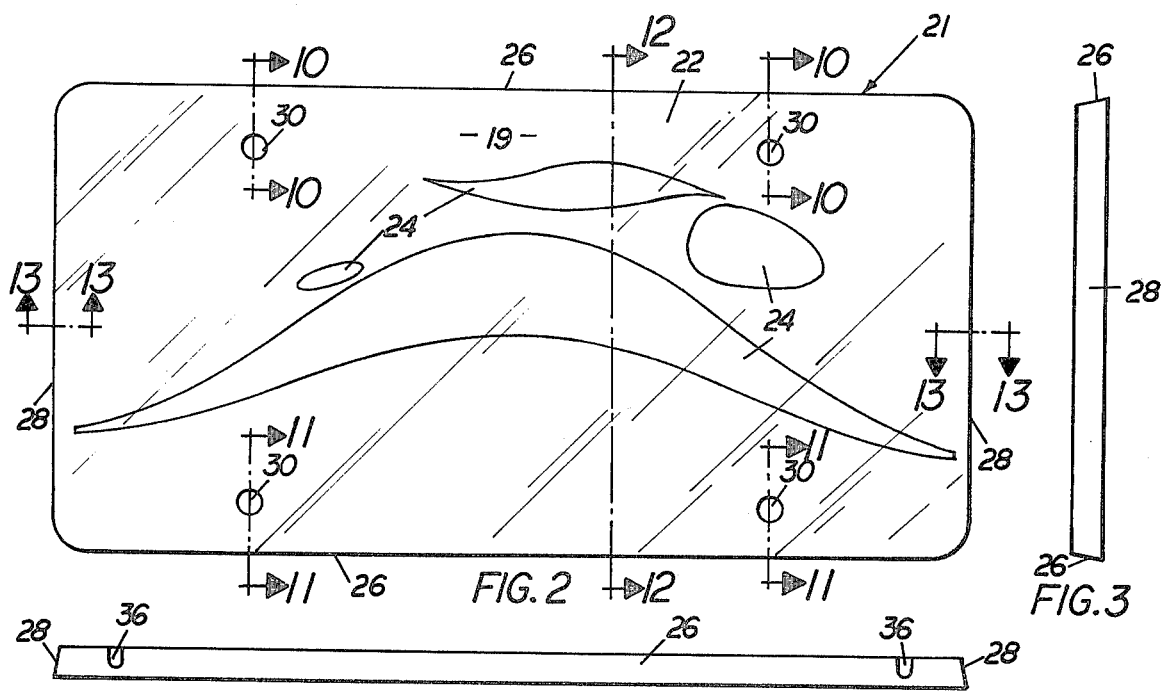
FIG. 2
FIG. 3
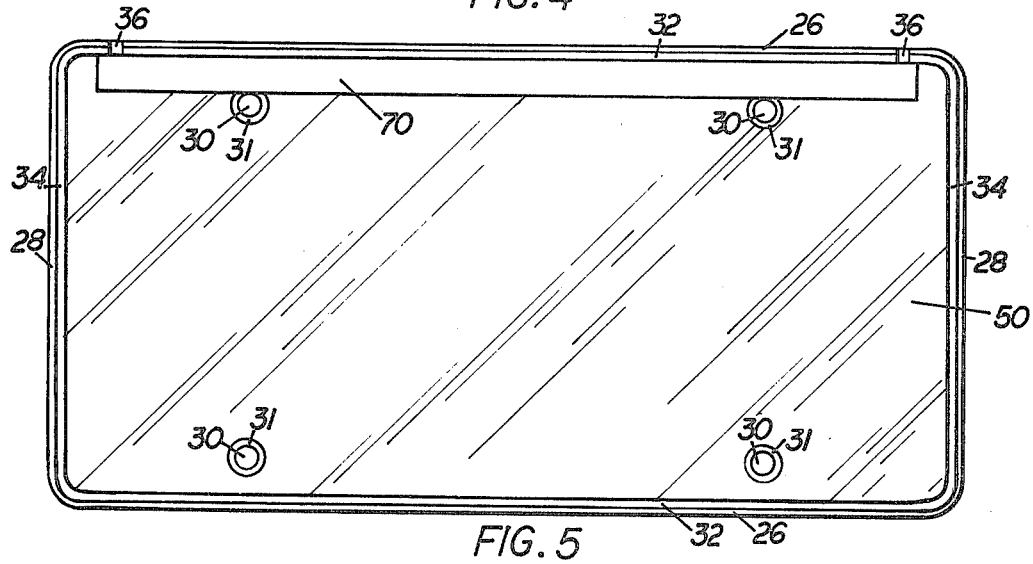
FIG. 4
FIG. 5

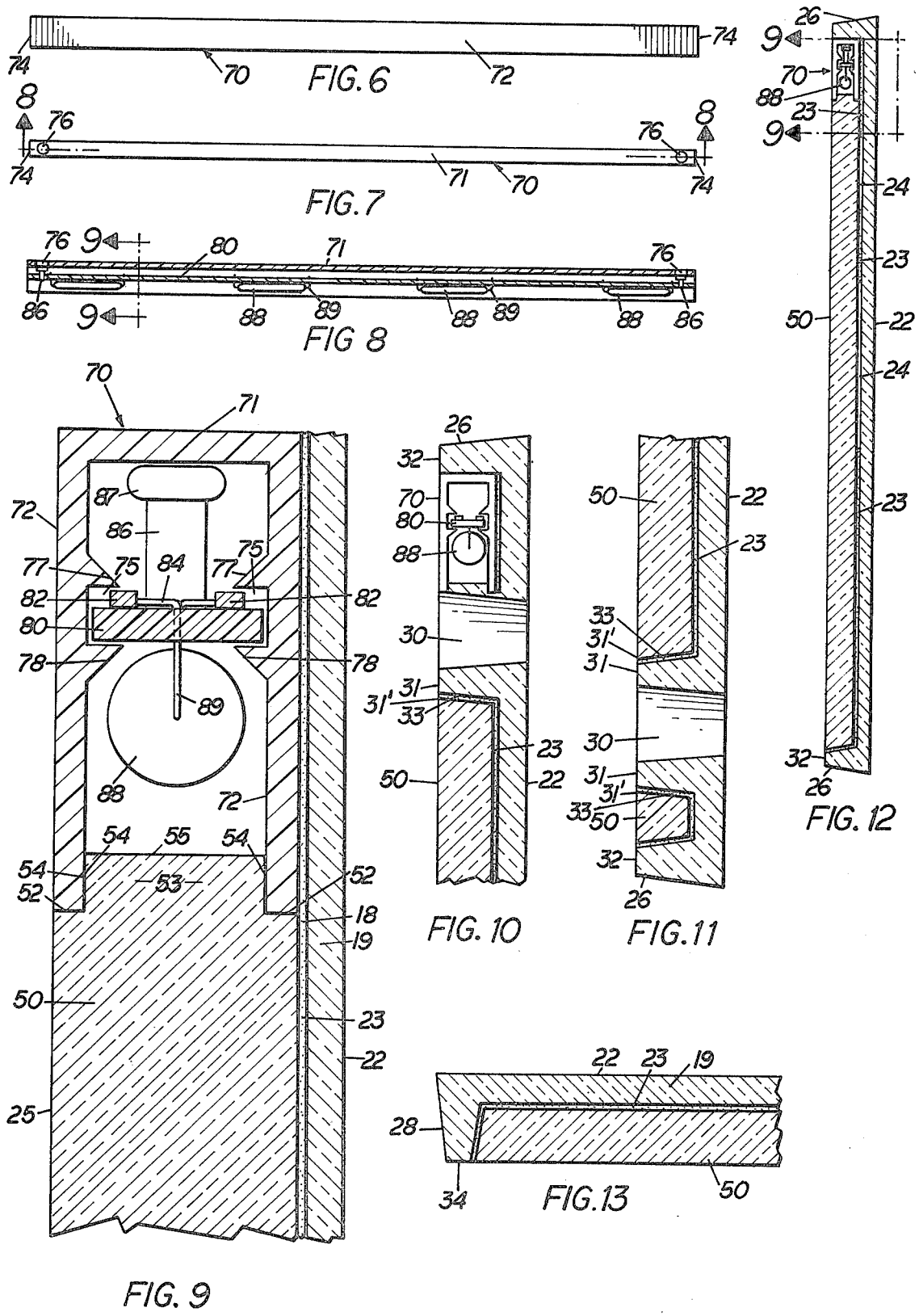

ILLUMINATED DISPLAY ASSEMBLY

BACKGROUND OF THE INVENTION

1. Field of the Invention

The present invention is directed towards an illuminated display structure in the form of a display plate or the like capable of being mounted on a vehicle in the position of a license plate wherein the illumination of a light transmitting material plate serves to direct light through non-opaque cutout portions of an opaque shield structure in order to present an illuminated display of predetermined indicia defined by the non-opaque illuminated portions.

2. Description of the Prior Art

Illuminated display panels or display signs used for informative or decorative display such as in advertising or the like are quite well known in the prior art. Typically, such devices include structural components used in combination with light source such as one or more light bulbs wherein the field of illumination covers the information or "display" to be illuminated and exposed for viewing. Further, the prior art structures generally incorporate the illumination source being directed onto the face of a display surface to facilitate viewing thereof. Alternately, the source of illumination is built into the interior of the subject display structure to accomplish a form of "backlighting."

The following United States Patents are representative of the above-type structures available in the prior art: U.S. Pat Nos. 2,551,662 to Mohr; 2,251,861 to Willer; 2,727,327 to Colby; 2,297,851 to Wyss, Jr.; 3,402,492 to Clapham, Jr.; 3,349,511 to Aronoff; 3,406,475 to O'Donnell; 3,464,133 to De Poray; 3,497,686 to Young; and 3,968,584 to Kingston.

Further included in the above-noted prior art structures are display assemblies incorporating the use of a plastic or like material light transmitting plates or panels wherein a source of illumination such as a light bulb is exposed directly to a portion of the light transmitting panel for the purpose of illuminating the entire panel. Indicia is then structured or formed on the panel itself and accordingly enhanced or illuminated to facilitate viewing thereof.

However, in spite of the extensive activity in this area, there is still a need for a structurally versatile illuminated display assembly capable of displaying illuminated indicia or like informative material. Further, such a preferred structure should be compact in design and construction so as to be capable of being mounted on a mobile vehicle such as an automobile in the general vicinity of or as a substitution for a license plate.

SUMMARY OF THE INVENTION

The present invention is directed towards an illuminated display assembly which is particularly structured and designed to be mounted on an automobile or like vehicle. More specifically, the subject display assembly is structured and configured to be mounted in the place of the front license plate assembly associated with all or at least most modern day automobiles. It should be noted however that the structure is of course not limited to such application and can be readily adapted for use as an illuminated display sign or structure in more conventional or permanent locations.

The subject illuminated display assembly comprises a display plate formed of a plastic or like light transmitting material which may be designed to be formed from plastic material of varying colors. An illumination means incorporating an illumination source in the form of a plurality of light bulbs are mounted adjacent one predetermined edge of the display plate and positioned to direct light through the predetermined edge and into the interior of the display plate. When the illumination is so directed, the entire display plate is of course illuminated due to the light transmitting quality of the material from which the plate is formed. The illumination means further comprises a circuit board having an elongated strip configuration structured to have mounted thereon, or more specifically, encapsulated therein electrical conductors. These conductors are disposed to electrically interconnect the plurality of light bulbs to a given power source which per se is not part of the present invention. The strip having the plurality of light bulbs mounted thereon is affixed in direct light transmitting communication to the above-mentioned predetermined edge of the display plate. This disposition is ensured through the provision of a housing means. The housing means is specifically structured to substantially embrace or otherwise be affixed to the predetermined edge of the panel.

The housing means further comprises a mounting channel formed on the interior of the housing means and extending along its length. This mounting channel is specifically dimensioned and structured to slidingly receive and supportingly engage the circuit board or strip. The structure of the housing means is such as to thereby position the plurality of illumination bulbs in immediately overhanging relation to the predetermined edge. The housing means is opaque and thereby prohibits light from exiting the housing means except through one opened end. This opened end is disposed and structured to embrace or be mounted on the predetermined edge of the plate so that illumination passes directly through this edge into the interior of the display panel for illumination thereof.

Further structural features of the present invention include the provision of a shield means which is disposed or structured to define the exposed, viewable surface of the display assembly. This shield means is formed to be opaque with the exception of non-opaque portions defined over the surface thereof. These non-opaque portions are specifically configured to define predetermined letters, numerals, or design, or any like or intended indicia. Accordingly, upon illumination of the display panel, light is transmitted through the non-opaque portions of the shield means which, as set forth above, are configured or designed into the intended indicia. Accordingly, illumination of the display plate serves to illuminate the intended or designed indicia which is readily apparent from viewing the exposed surface of the display assembly.

A support frame is structured to at least partially enclose and support the display plate for mounting in the intended location such as on a vehicle. The shield means and the support frame may be incorporated as a single structure wherein the shield means is defined as an opaque, outer exposed, viewable surface of the frame which covers the display plate.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings, in which:

FIG. 1 is a front elevational view of a vehicle with the subject illuminated display assembly mounted thereon.

FIG. 2 is a front plan view of the display plate of the subject invention.

FIG. 3 is an end view of the embodiment of FIG. 2.

FIG. 4 is a top view of the embodiment of FIGS. 2 and 3.

FIG. 5 is a rear plan view of the embodiment of FIG. 2.

FIG. 6 is a front plan view of a housing for the illumination source of the present invention.

FIG. 7 is a top view of the embodiment of FIG. 6.

FIG. 8 is a sectional view along line 8—8 of the illumination source of FIG. 7.

FIG. 9 is a sectional view in partial cutaway along line 9—9 of FIG. 12 showing details of the illumination assembly of the present invention.

FIG. 10 is a sectional view along line 10—10 of FIG. 2.

FIG. 11 is a sectional view along line 11—11 of FIG. 2.

FIG. 12 is a sectional view along line 12—12 of FIG. 2 of the display plate and support frame in combined relation with one another.

FIG. 13 is a detailed view in partial cutaway.

Similar reference characters refer to similar parts throughout the several views of the drawings.

DETAILED DESCRIPTION OF THE PREFERRED EMBODIMENT

Figure 14:
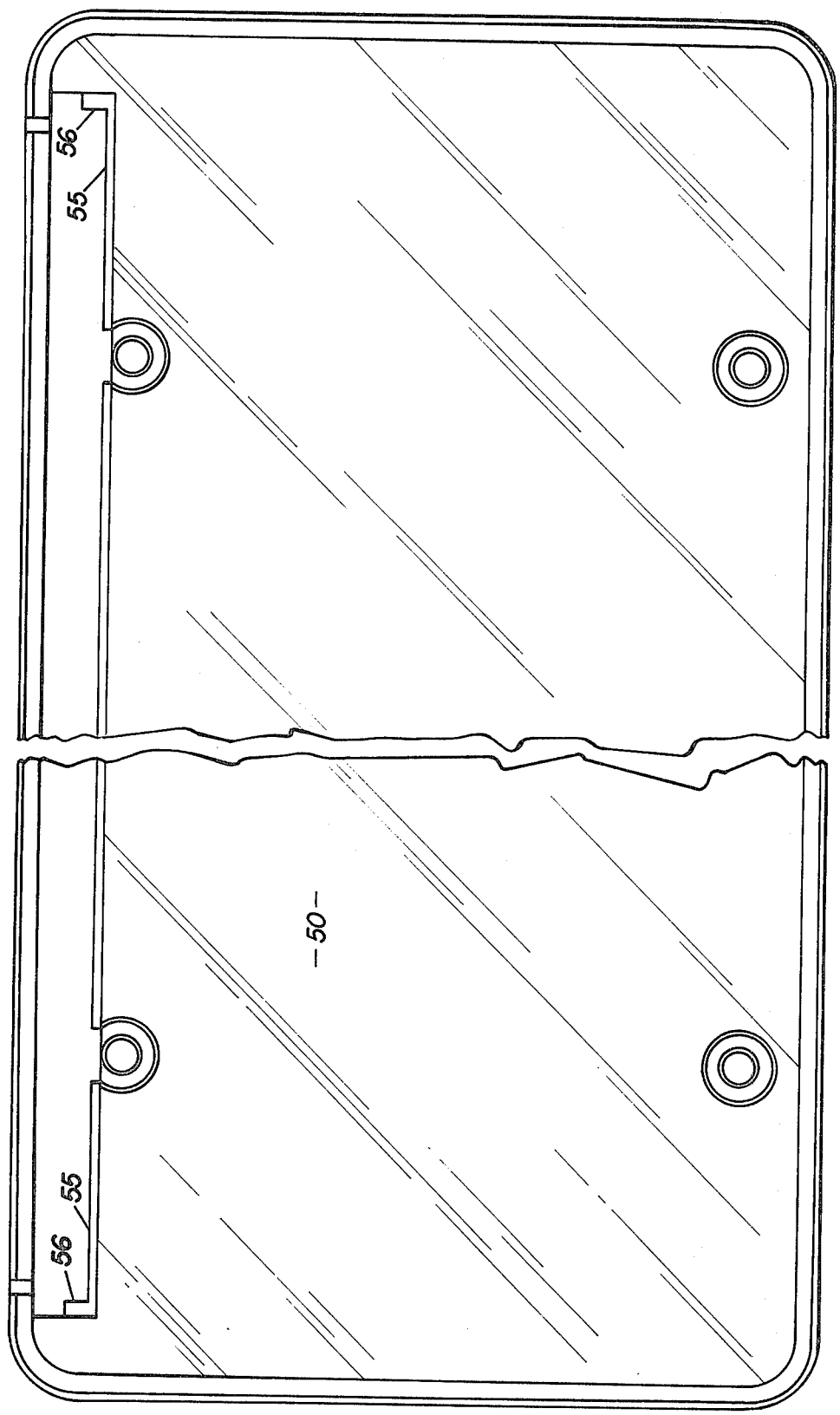
FIG. 14 is a detailed view in partial cutaway showing structural details of the mounting structure for the housing of the present invention on the display plate.

As shown in FIG. 1, the present invention is directed towards an illuminated display assembly and generally indicated as 20 which is structured and configured to be sufficiently compact so as to be mounted on a vehicle such as an automobile or the like. However, it should be noted that the subject illuminated display assembly is readily adaptable for a more conventional application or mounting and is certainly usable other than being mounted on vehicles.

With reference to FIGS. 2 through 5, the present invention includes a support frame generally indicated as 21 and comprising an exposed viewable exterior surface 22. Longitudinal edges 26 and side edges 28 extend outwardly from the plane of the support frame as best shown in FIGS. 12 and 13. Further, an additional border flange 32 extends along the longitudinal edges as does an additional border flange 34 extending along the side edges (FIG. 5). Therefore, a base plate 19 is effectively recessed by the surrounding longitudinal side edges and accompanying flanges as set forth above. This recess is specifically dimensioned and configured to support and effectively house a display plate 50 therein. As will be explained in greater detail hereinafter, the display plate 50 is formed from a light transmitting plastic or like material. Further structural features associated with the support frame 21 include mounting or connecting apertures 30. Finger elements 31 extend outwardly from the rear surface of the base plate 19 as best shown in FIGS. 10 and 11. Apertures 31' are formed in the display plate 50 and are sufficiently dimensioned to surround the fingers 31. The apertures 30 are structured to allow passage therethrough of substantially conventional connectors to secur the support frame 21 and accordingly the attached display plate 50 to a vehicle or like facility on which the entire display assembly 20 is mounted.

The present invention further comprises an illumination means including an illumination source comprising a plurality of illumination bulbs 88 disposed in spaced apart relation to one another. Each of the bulbs is supported by conductor portions 89 extending from opposite ends of bulb 88 to a common, undersurface of a circuit board 80. This circuit board has an elongated strip configuration and comprises a base or base strip of what may be considered the circuit means serving to interconnect the individual illumination bulbs 88 to a power source (not shown). More specifically, the circuit means including circuit board or base strip 80 has at least partially encapsulated therein conductor means 84. These conductors are disposed and are anchored as at 82 to interconnect the various bulbs to one another and eventually to an electrically conductive receptacle 86 protruding from the opposite ends of the circuit board 80 as shown in FIGS. 8 and 9. Each of the receptacles 86 include a head portion 87 designed to receive the connection of an additional conductor (not shown) permanently affixed to the vehicle or other platform on which the display assembly 20 is mounted. This other conductor (not shown) is of course connected to a battery or the like power source (not shown) as set forth above which serves to selectively activate the individual bulbs. A housing means generally indicated as 70 includes an upper end 71 and interconnected integral spaced apart parallel legs 72. The opposite end of legs 72 is defined by an open end extending along the length of the housing 70. This open end is specifically dimensioned and configured to at least partially embrace a predetermined edge 53 of the display plate 50. This embracing connection takes place by virtue of the distal ends 52 of each leg 72 being disposed within slots 54 integrally formed in the upper edge 53 of the display plate 50 thereby forming an upwardly protruding flange 55. As best shown in FIG. 9, the distal ends 52 of the legs 72 are embracing opposite sides of the flange 55 thereby securely mounting the housing means 70 and accordingly the illumination mean within the housing in direct light transmitting relation to the predetermined edge 53 of the plate 50.

Additionally, as shown in FIG. 14, a lateral support flange 56 is integrally attached to and is located at opposite ends of flange 55 and accordingly is an integral part of display plate 50. The lateral support flange 56 is structured so as to receive opposite ends of housing 70 in order to provide additional support for the housing as it is supported about flange 55 on end 53 of the display plate. Further structural features of the present invention include the provision of a mounting channel formed on the interior of the housing means 70. This mounting channel is defined by outwardly projecting ribs 77 and 78 formed on the inner surface of each leg 72 and extending outwardly towards the center of the housing means. Such formation defines elongated grooves 75 which extend along the length of the housing and which are specifically configured and dimensioned to slidingly engage and/or support longitudinal edges of the circuit board or base strip 80. It is readily seen therefore that the entire illumination means including the plurality of illumination bulbs 88, the attached circuit board 80 and receptacle 86 are easily removed from the housing means by sliding disengagement therefrom. This removal facilitates discarding of the expired or used or defective illumination means and replacement by another without altering the physical features of the overall assembly and providing additional versatility to the overall display assembly.

In operation, the illumination source including the plurality of illumination bulbs 88 are activated by connection of a conductor (not shown) positioned through each of the slots 36 formed on the support frame, and into the openings 76 on the housing so as to be secured in receptacles 86 and thus supplying electrical power to the electrical conductors 84 and 89 which in turn serve to power the individual bulbs 88. The housing means 70 is formed from an opaque material or alternately is coated with an opaque material such that light is forced to exit the housing mean only through the open end defined by the distal ends 52 of the parallel legs 72 of the housing means 70. This in turn directs the light through the flange 55 and the predetermined edge 53 to the interior of the display plate 50. Due to the fact that the display plate is formed, as set forth above, from light transmitting material, the entire display plate will be illuminated. As best shown in FIG. 9, additional structural features associated with the display plate 50 include the provision of a essentially reflective coating 25 being formed on the surface opposite to the disposition of the opaque material 23. More specifically, the coating 25 may be of white paint or any other material tending to reflect or direct light back into the interior of the display plate. Accordingly, when the light is directed into the interior of the display plate 50, the presence of the reflective coating 25 enhances the transmission of light throughout the display plate 50.

A shield means is provided in interruptive relation between the viewing surface 22 of the support frame 21 of base plate 19 and the correspondingly positioned surface 18 of the display plate 50. This shield means is formed from an opaque material or alternately is defined by an opaque coating disposed at some point in light interruptive relation between the surface 18 of display plate 50 and the viewing or exposed surface 22 of the base plate 19. This shield means however includes non-opaque portions 24 (FIGS. 2 and 12). It is therefore seen that the non-opaque portions 24 are effectively a part of the opaque material 23 but since any opaque material has been removed from these non-opaque portions, light is transmitted therethrough. These non-opaque portions are specifically configured into predetermined designs, letters, numerals or like indicia. As represented in FIG. 2, the collective non-opaque portions 24 form a given art design. However, such non-opaque portions can readily be formed into letters to form a name or numerals to display other information. In that the portions 24 are in fact non-opaque, light will be further directed from the illumination bulbs 88 into the interior of the display plate 50 and out through the non-opaque portions 24 which is clearly viewable from the exposed, exterior, viewable surface 22 of the support frame 21.

Therefore, when the illumination bulbs are illuminated only the non-opaque portions designed into predetermined indicia 24 are displayed as being illuminated as best shown in FIG. 1. The remainder of the viewing surface 22 appears darkened due to the presence of the opaque material defining the shielding means 23. It should be noted however that the shield means may further be defined by placing the opaque material on the exterior of the base plate 19 in coplanar relation with the surface 22.

In order to eliminate any "leaks" of light which would have a tendency to spoil the illuminated display, additional opaque material 23 surrounds the outwardly protruding fingers 31 as at 33 thereby preventing any light from being directed through the apertures 31' formed in the display plate 50 itself.

An additional structure of the present invention may include the material from which the support frame 21 is formed itself being opaque. This would eliminate the need for an opaque coating or portion 24 since the entire structure of the support frame, including its base plate 19, surrounding flanges 26 and 28, and protruding fingers 31 (FIG. 11) is formed from an opaque material and hence with selected opaque portions removed so as to make visible on face 22 non-opaque sections designating the intended indicia.

What is claimed is:

1. An illuminated display assembly of the type primarily designed for the display of predetermined indicia, said structure comprising:
   (a) a display plate formed from a light transmitting material, illumination means including an illumination source mounted adjacent a predetermined edge of said display plate and disposed to direct illumination through said predetermined edge into the interior of said display plate, whereby said display plate is illuminated;
   (b) housing means structured to removably support said illumination source therein, shield means being opaque and disposed between said display plate and an outer disposed and viewable surface of said display assembly, said shield means including non-opaque portions configured to define predetermined indicia and disposed to allow illumination from said illuminated display plate to be directed therethrough;
   (c) said illumination means comprising a circuit means disposed in electrical interconnection between said illumination source and a power source; and
   (d) said circuit means comprising a base, conductor means formed on said base and disposed and structured to interconnect said illumination source to a power source; said base and said housing means cooperatively structured for removable mounting of said base and said illumination source within said housing means.

2. A display assembly as in claim 1 wherein said housing is attached to said display plate and configured to extend along the length thereof, said housing being opaque and structured to direct illumination from said illumination source through said predetermined edge and into the interior of said display plate.

3. A display assembly as in claim 2 wherein said display plate comprises a flange integrally formed along said predetermined edge and extending outwardly therefrom in substantially coplanar relation to said display plate, said housing means structured to substantially embrace said flange in substantially surrounding relation thereto along the length thereof, whereby illumination passes through said flange, into the interior of said display plate and out of said non-opaque portions causing illumination of said predetermined indicia.

4. A display assembly as in claim 1 further comprising frame means structured to support said display plate therein, said shield means disposed between said display plate and an outer exposed surface of said frame means.

5. A display assembly as in claim 4 wherein said frame means and comprises a base plate disposed in flush engagement with said display plate, said shield means disposed in light interrupting relation between said display plate and base plate, said non-opaque portion formed and disposed to direct light from said display plate to the interior surface of said base plate.

6. A display assembly as in claim 5 wherein said frame means comprises connector means including a plurality of fingers extending outwardly from an inner surface of said frame, each finger being opaque and defining a centrally located connector aperture dimensioned and configured for extension of a connector therethrough, said display plate including a plurality of apertures each disposed and configured for surrounding engagement to one of said fingers, whereby light is substantially prohibited from passing through said display plate apertures to the exposed surface of said frame means.

7. A display assembly as in claim 1 wherein said base comprises an elongated strip configuration including a longitudinal dimension sufficient to extend along the effective length of said predetermined edge, said illumination source connected to a surface of said base strip and disposed in exposed relation to said predetermined edge; said housing means comprising a mounting channel formed on the interior thereof and extending along the length thereof, said mounting channel structured and dimensioned to slidably receive and support said base strip therein, said base strip movably disposed within said housing means and in communicating relation to said predetermined edge, whereby said illumination source may be removed and replaced after expiration thereof.

8. A display assembly as in claim 7 wherein said housing means comprises spaced apart legs disposed in substantially parallel relation to one another, free ends of said legs defining an open ended structure of said housing means configured for attachment to said predetermined edge, said channel means defined by a grip structure formed on the inner surface of each of said legs in spaced, parallel relation to one another, each of said grip structures disposed and configured to slidably engage opposite longitudinal edges of said base strip.

9. A display assembly as in claim 8 wherein said illumination source comprises a plurality of illumination bulbs disposed in spaced apart relation to one another and mounted on said base and extending along the length thereof and along the length of said predetermined edge, said plurality of illumination bulbs being further disposed so as to direct light through said predetermined edge into the interior of said display plate.

* * * * *